United States Patent [19]

Lambot et al.

[11] 4,428,602

[45] Jan. 31, 1984

[54] INNER TUBE ELEMENT FOR A DOUBLE TUBE CORING APPARATUS AND PROCESS FOR THE MANUFACTURE OF THIS TUBE ELEMENT

[75] Inventors: Honoré J. Lambot, Wauthier-Braine, Belgium; Maria J. H. Fliervoet, Zwolle; Pieter Kramer, Hardenberg, both of Netherlands

[73] Assignee: Societe Anonyme Diamant Boart, Zwolle, Netherlands

[21] Appl. No.: 335,031

[22] Filed: Dec. 28, 1981

[30] Foreign Application Priority Data

Dec. 30, 1980 [BE] Belgium ............................ 203359

[51] Int. Cl.³ ................... F16L 47/00; F16L 55/00; F16L 25/00
[52] U.S. Cl. ..................................... 285/239; 285/174; 285/423; 138/109; 175/236
[58] Field of Search ............... 285/239, 174, 423; 138/109; 175/236, 239, 253

[56] References Cited

U.S. PATENT DOCUMENTS

| | | | |
|---|---|---|---|
| 3,092,192 | 6/1963 | Deely | 175/253 |
| 3,572,392 | 3/1971 | McLarty | 138/109 |
| 3,768,842 | 10/1973 | Ahlstone | 285/239 X |
| 3,874,465 | 4/1975 | Young et al. | 175/236 |
| 4,279,275 | 7/1981 | Stanwool et al. | 138/109 |

*Primary Examiner*—Richard J. Scanlan, Jr.
*Attorney, Agent, or Firm*—Sughrue, Mion, Zinn, Macpeak and Seas

[57] ABSTRACT

An inner tube element for a coring apparatus comprising a double tube, made of synthetic resin reinforced with fibers and provided at its ends with connecting nipples, is entirely made of synthetic resin and overlaps, at each of its ends, a part of the nipples having a rough surface gripped by said fibers, preferably in the form of webs of glass fibers.

The inner tube element is manufactured by a process in which two nipples or couplings are placed onto a cylindrical mandrel having a constant section and rotating about its longitudinal axis, at a predetermined distance corresponding to the tube element to be manufactured, a part of said nipples having an inner diameter substantially identical to the diameter of the mandrel and having a rough surface, and fibers coated with a synthetic resin are wound helically onto said cylindrical mandrel, so as to overlap the rough part of said nipples.

6 Claims, 6 Drawing Figures

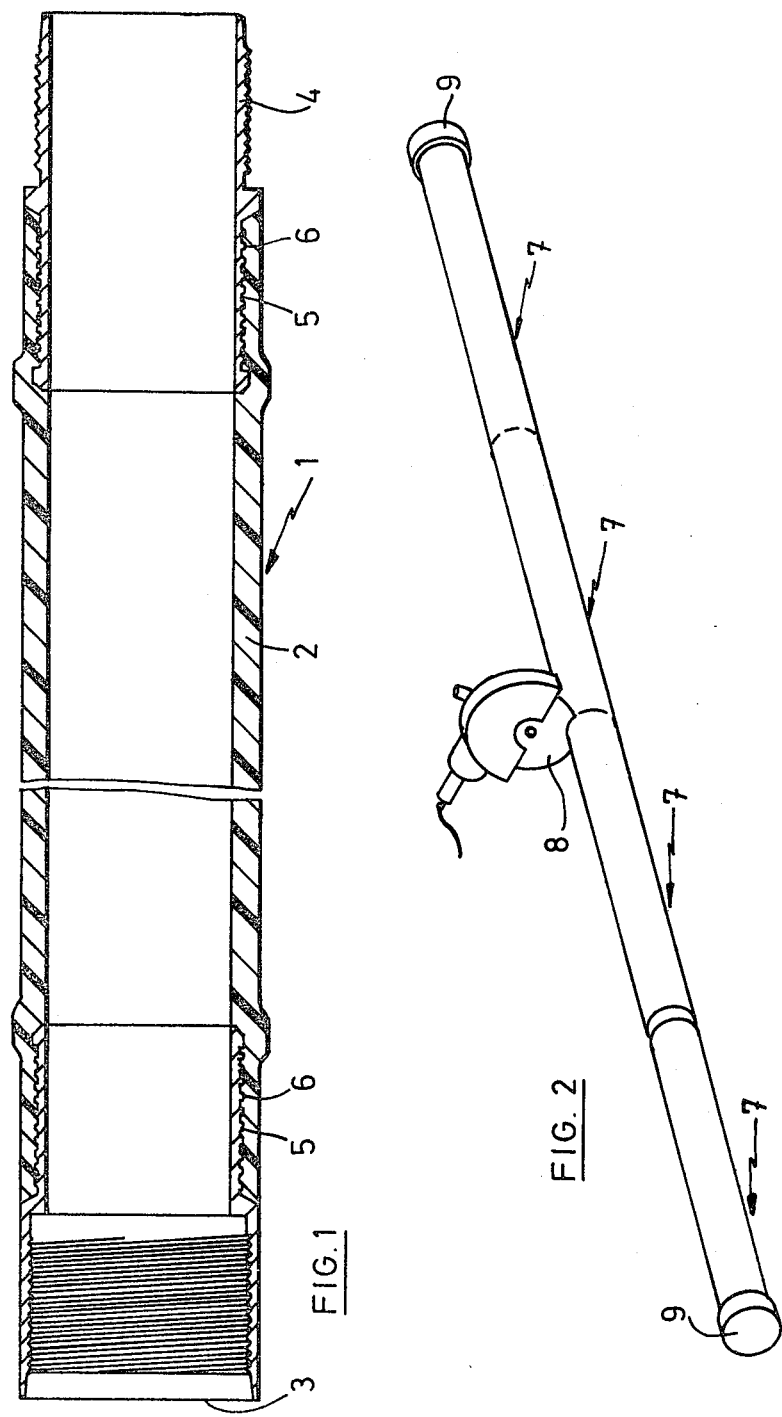

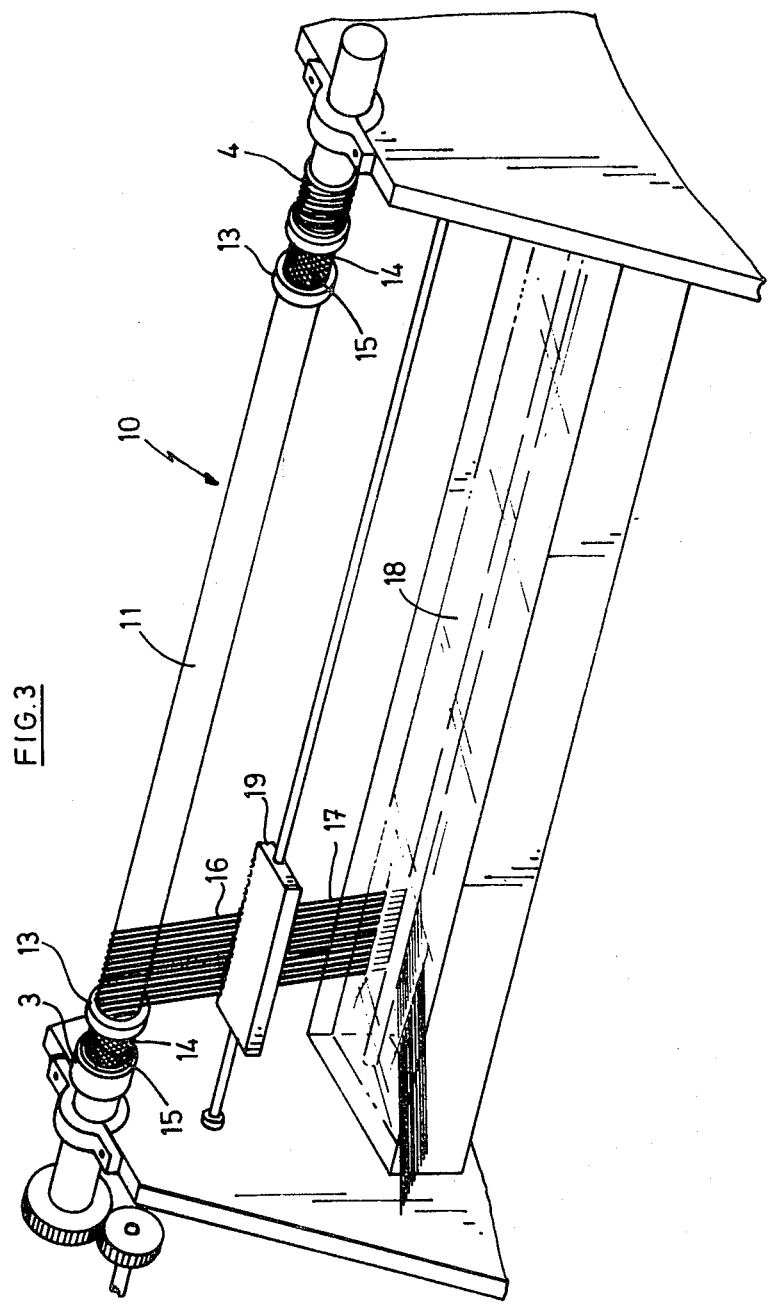

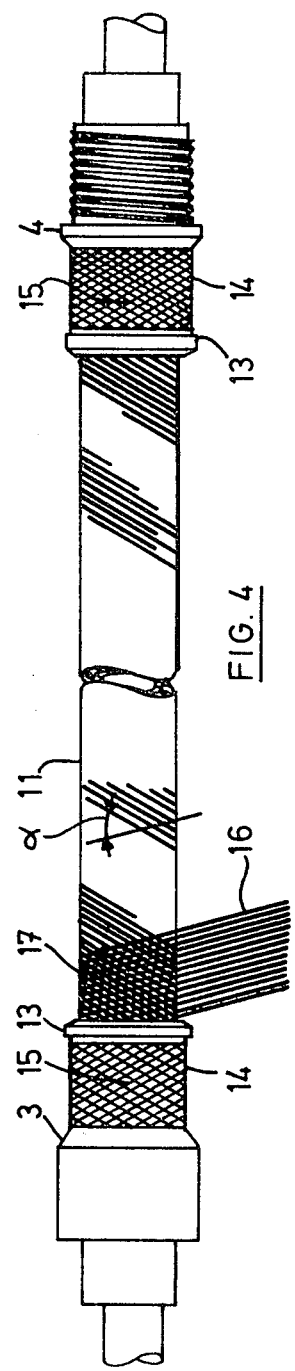
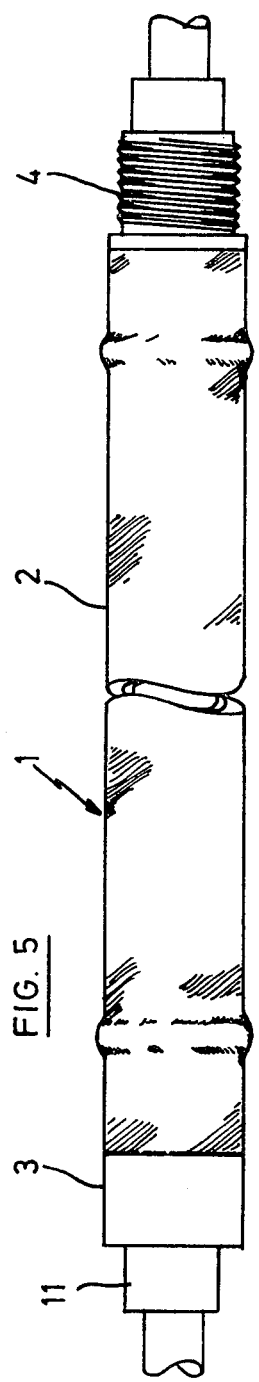
FIG. 4
FIG. 5

INNER TUBE ELEMENT FOR A DOUBLE TUBE CORING APPARATUS AND PROCESS FOR THE MANUFACTURE OF THIS TUBE ELEMENT

FIELD OF THE INVENTION

This invention relates to an inner tube element for a coring apparatus comprising a double tube, said element consisting of a tube length having a substantially constant section, made of synthetic resin and provided at its ends with nipples or couplings for connecting it to other inner tube elements.

This invention also relates to a process for the manufacture of inner tube elements of the above type provided with couplings for connecting them to other inner tube elements.

PRIOR ART

Coring aparatuses provided with two coaxial tubes are commonly used in mining or petroleum drilling for taking a sample of the geological layers crossed by the coring apparatus. These apparatuses comprise, on the one hand, an outer tube consisting of an outer set of hollow rods carrying a boring crown and, on the other hand, an inner set of hollow rods longitudinally locked by one of its ends to the outer tube which can rotate about this inner tube provided, at its other end, with a core extracting sleeve. The inner tube is generally made of steel.

The U.S. Pat. No. 3,092,192 discloses a coring apparatus comprising an outer tube made of steel, an inner tube also made of steel and possibly comprising two semitubular members, as well as a third coaxial tube entirely made of synthetic resin and used for enclosing and protecting a sampled core.

Said three-tube apparatuses commonly called "liners" are cumbersome. The presence of a third tube made of synthetic resin reduces the section of the coring apparatus which is available for collecting the core. The results of analysis made during a mining or petroleum drilling are all the more precise that the section of the core is larger. Moreover, the manufacture of triple tube coring apparatuses is difficult, since the dimensions of these apparatuses must be adapted to the dimensions of the tube made of synthetic resin and vice-versa. The manufacture tolerances are severe, since the tube made of synthetic resin must closely match the inner tube made of steel.

The U.S. Pat. No. 3,874,465 discloses a coring apparatus comprising three coaxial tubes, which is similar to the above described apparatus, except that the inner tube is made of two semitubular portions made of synthetic resin reinforced with glass fibers. The inner surface of the semitubular portions is coated with a further tube made of synthetic rubber.

The triple tube coring apparatus according to U.S. Pat. No. 3,874,465 comprising a tube made of synthetic resin are also cumbersome and allow the collection of a core having a smaller section than that of a core obtained by a double coring apparatus, when both apparatuses have the same outer diameter.

The manufacture of a coring apparatus according to U.S. Pat. No. 3,874,465 comprising a tube made of synthetic resin is also difficult. In a first step, a tube made of synthetic resin reinforced by means of glass fibers must be manufactured. The tube must then be longitudinally severed by means of a saw so as to form two semitubular portions. When the tube is sawn, a cloud of synthetic resin dust loaded with fine particles of glass fibers is unavoidably formed, said dust irritating the respiratory tract and causing itching on the body. Moreover, said glass fiber particles are considered as cancerigenic.

The above described known coring apparatus has also a weak resistance to bursting.

The cores collected in deep borings from geological layers having a substantial content of volatile elements contain occluded or adsorbed gases which are submitted to considerable pressures, to which the inner tube of the coring apparatus must resist, when said tube is retrieved. As soon as the coring apparatus is retrieved outside the well, the boring core is cleared by unfastening and removing the semitubular elements. The latter contain a rubber sleeve which becomes deformed and releases the gases. Said rubber sleeve protects the core against any deterioration, but does not allow to retain all the volatile materials in said core.

BRIEF DESCRIPTION OF THE INVENTION

An object of the present invention is to provide means for avoiding the above described drawbacks, while perfectly protecting and allowing an easy handling of the boring cores.

This invention relates to an inner tube element for a double tube coring apparatus, consisting of a tube length having a substantially constant section, made of a synthetic resin and provided at its ends with nipples or couplings for connecting it to other inner tube elements, said inner tube element being mainly characterized by the fact that said tube length is entirely made of synthetic resin reinforced with fibers and the said tube length overlaps, at each of its ends, a part of the nipples having a rough surface gripped by said fibers.

According to an embodiment of the invention, the above nipples have a surface with corrugations gripped by fibers which are preferably twisted.

In a more particular embodiment, the nipples comprise a milled or knurled ring gripped by the fibers in the form of a woven or non woven web of fibers.

Said couplings are preferably steel nipples which are coaxial to the tube length at each end thereof and are embedded in said tube length so that the inner diameter of the part overlapped by the tube length is equal to the inner diameter of the tube length.

The tube length itself is preferably made of an epoxy resin preferably reinforced by webs of glass fibers.

This invention also relates to a process for the manufacture of the above described inner tube elements for a double tube coring apparatus, said process being essentially characterized by the fact that two nipples or couplings are placed onto a cylindrical mandrel having a constant section and rotating about its longitudinal axis, at a predetermined distance corresponding to the tube element to be manufactured, a part of said nipples having an inner diameter substantially identical to the diameter of the mandrel and having a rough surface, and fibers coated with a synthetic resin are wound helically onto said cylindrical mandrel, so as to overlap the rough part of said nipples.

According to a feature of the process, the fibers are wound in the form of twisted fiber webs crossing each other, so that the crossing angle is comprised between 40° and 60°.

In a particular embodiment of the process according to this invention, two steel nipples or couplings each provided with a gripping ring and having an inner diameter which is substantially equal to the diameter of a mandrel and an outer milled or knurled surface are placed onto said mandrel at a predetermined distance from each other, and webs of fibers coated with a synthetic resin are wound helically onto the mandrel and onto each of said rings of the spaced nipples.

It has surprisingly been found that the inner tube elements according to this invention which are made of synthetic resin reinforced by means of fibers, preferably glass fibers, have a bursting, collapsing and tensile strength which is quite comparable to that of an inner tube made of steel, in spite of the high temperatures which prevail in the boring wells in which the coring apparatuses are used.

DETAILED DESCRIPTION OF THE INVENTION

Other details and features of the invention will appear in the following description of the attached drawings which show diagrammatically, as a non limiting example, an embodiment of an inner tube element according to this invention and which illustrate the process for the manufacture of said inner tube element.

In these drawing:

FIG. 1 is a longitudinal section of an inner tube element according to the invention, provided with tapped or threaded couplings or nipples;

FIG. 2 is a perspective view of a tube section containing a core portion;

FIG. 3 is a perspective view of a machine for the manufacture of an inner tube element according to the invention;

FIG. 4 is a longitudinal section of a tube element while being manufactured in the machine shown in FIG. 3;

FIG. 5 is a longitudinal section similar to that of FIG. 4, showing an entirely manufactured tube element.

In these figures, the same references designate the same or similar parts.

Figure 6:
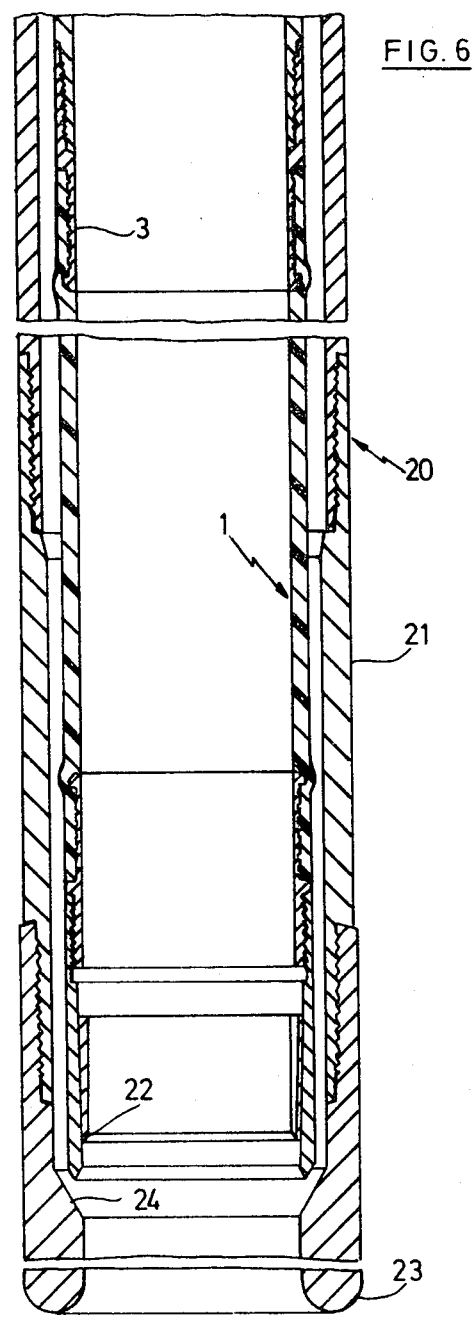
FIG. 6 is a longitudinal section of a double tube coring apparatus comprising an inner tube element according to the invention.

The inner tube element 1 for a double tube coring apparatus according to this invention, shown in FIG. 1, consists of a rigid tube length 2 made of epoxy resin, provided, at its ends, with a male threaded coupling nipple 4 and with a female threaded coupling nipple 3, both nipples being made of steel.

The section of the tube element is substantially constant. The epoxy resin is reinforced by means of twisted fibers, preferably glass fibers. The tube element 1 overlaps, at each of its ends, a part of a steel nipple 3, 4 having a rough surface 6 gripped by said twisted fibers. The twisted fibers 5 are preferably in the form of webs. The nipples 3,4 comprise a knurled or milled ring 13.

The steel nipples 3, 4 extend coaxially to the tube element 1 at each end of the latter. Said nipples 3, 4 are embedded in the tube element 1, so that the innter diameter of the nipple part overlapped by the tube element is equal to the inner diameter of this element.

As soon as the coring apparatus is retrieved, without the necessity of clearing the collected core from semitubular envelopes, the inner tube element 1 containing the collected core is cut into sections 7 of suitable length by means of a tool which is not cumbersome and may, for example, be a portable circular saw 8 (FIG. 2).

The sections 7 of inner tube 1 may be used as core boxes for the transport and the conservation of the cores, before and after the longitudinal severing of said sections 7.

For this purpose, the section 7 of inner tube 1 may be closed at their ends by means of caps 9.

The machine shown in FIG. 3, designated in general by reference 10, is used for the manufacture of an inner tube element according to this invention. Said machine comprises a mandrel 11 which may rotate about its longitudinal axis I-I'. This mandrel 11 is rotated by means of a pinion 12.

Onto the mandrel 11 are placed, at a predetermined distance corresponding to the desired length of the tube length or element, a male coupling nipple 4 and a female coupling nipple 3 comprising each a gripping ring 13 having an inner diameter substantially equal to the diameter of the mandrel 11, as well as an outer surface 14 provided with corrugations 15 (knurled surface). These rings 13 face each other on the mandrel 11, as shown in FIG. 3.

The grooves of the corrugations or knurlings 15 correspond to the diameter of the twisted fibers 16 which are helically wound onto the mandrel 11 for reinforcing the body of the inner tube element 1. The twisted fibers 16 are made of a multiplicity of strands of glass fibers. The fibers are used in the form of woven or non woven webs 17, which are impregnated with an epoxy resin in the resin bath 18. The fiber webs are then helically wound onto the mandrel 11 of the machine, so as to obtain superimposed homogeneous web layers crossing each other by an angle $\alpha$ comprised between about 40° and 60°. The fiber webs 17 are guided by means of a slide 19. An epoxy resin prepared from ethylene oxide or epichlorhydrine and bisphenol A is advantageously used.

The crossing angle is responsible for the tensile strength and for the bursting resistance of the tube element 1. The more the crossing angle is large, the more the tensile strength will be large, but the more the bursting angle will be small.

For an inner tube element having an average diameter of 12 centimeters, a crossing angle of about 55° is preferably selected. Such an angle gives a resistance to tensile forces of more than 3000 kilograms.

In order to expedite the hardening of said epoxy resin, a hardening agent, such as an aqueous solution of a peroxide, is regularly sprayed onto the surface of the tube element 1 during the manufacture thereof. The fiber webs 17 are wound onto the mandrel 11, so as to cover the knurled ring 13 of the coupling nipples 3, 4, so as to embed firmly said nipples into the body of the tube element 1, as shown in FIG. 5.

As the glass fiber webs 17 have a very high tensile strength, they confer to the tube elements 1 a resistance which is quite comparable to that of a steel tube, not only in respect of bursting and crushing or collapsing, but also in respect to traction.

During the retrieval of the coring apparatus, the inner tube thereof is sometimes submitted to very high pressures.

The traction force to be exerted by a coring apparatus 20, as shown in FIG. 6, for separating a core collected in a rock layer may be very important. For this purpose, the entire coring apparatus 20, including the inner tube 1 and the outer tube 21 is raised. Whereas the outer steel tube 21 is freely raised without being deformed, the inner tube 1 is locked at one end by the core extracting sleeve 22 at the lower end of the coring apparatus. Since the inner tube 1 is fixed to the outer tube 21, at its other end, by means of a latch (not shown), said inner tube 1 is submitted to an important traction and is unavoidably stretched on a length corresponding to the distance between the core extracting sleeve 22 and the boring crown 23, for enabling the flow of a boring fluid.

When it is stretched, the inner tube 1 causes the core extracting sleeve 22 to bear against a shoulder 24 of the boring crown 23. The outer tube 21 which is entirely made of steel can transfer much more important tensile forces to the boring crown than the inner tube 1.

The important tensile forces to be used for detaching the core from the core extracting sleeve 22 are applied to the core through said shoulder 24 rigidly maintained with respect to the outer tube 21.

The elongation or stretching of the inner tube corresponds normally to the distance between the core extracting sleeve 22 and the shoulder 24 of the boring crown 23, said distance being needed for enabling the boring fluid to flow toward the boring crown.

Due to the fact that they are anchored to the twisted glass fibers, the coupling nipples 3, 4 of usual size (4 inches) are capable of resisting enormous tractions of three to ten tons which may occur in deep borings, without danger of shearing or deformation, in spite of the high temperatures prevailing in the wells wherein these tubes are used. These temperatures may reach 80° C. at a boring depth of about 2000 meters and even more than 100° C. at a boring depth of about 3000 meters.

The synthetic resin reinforced by means of glass fibers has a small Yound modulus compared to that of steel. When an inner tube element made of synthetic resin is used, the tube subjected to an important traction will become deformed long before the threaded steel coupling nipples, so that the latter are not damaged and can be used again.

For this purpose, the steel nipples 3, 4 are removed, by severing the tube element, when the latter is raised with the core, when the coring apparatus is retrieved.

The resin residues which still adhere to the nipples are removed by heating and the nipples are then ready to be used again.

The inner tube elements according to this invention have the following advantages:

no corrosion problems;

increased homogeneity in respect of the resistance of the tubes;

possibility of transport of an unchanged core, as it has been collected;

easy manufacture: the inner diameter of the tube elements corresponds to the diameter of the mandrel, whereas the outer diameter may very within rather wide limits, since this outer diameter is only subjected to one restriction, namely that it must allow sufficient space for the flow of the boring liquid;

possibility of longitudinal and transverse cutting of the coring tube on the workings for an immediate analysis by the geologists;

use of portable tools;

possible recovery of the nipples, when steel coupling nipples are used.

The invention is of course not limited to the above described details which can be modified within the scope of the following claims.

We claim:

1. An inner tube element for a double tube coring apparatus for mining or petroleum drilling, said apparatus comprising an outer tube surrounding an inner tube including inner tube elements coupled to one another by steel nipples, wherein each inner tube element consists of a tube length made of synthetic resin reinforced with fibers and overlaps, at each of its ends, a part of a nipple, the internal diameters of the nipples and the tube length being substantially equal, characterized in that said nipples have a rough external surface, that said fibers grip said rough external surface of the nipples in order to secure the tube length thereto, and that said inner tube element presents over its whole length a constant section, the external diameter of which is substantially equal to the external diameter of the nipples.

2. Inner tube element according to claim 1, characterized in that said fibers are twisted and the nipples have a surface provided with a multiplicity of ribs or corrugations for gripping the twisted fibers.

3. Inner tube element according to claim 2, characterized in that the twisted fibers are in the form of fiber webs and the nipples each comprise a ring provided with a knurled surface for gripping the fiber webs.

4. Inner tube element according to claim 1, characterized in that it is made of epoxy resin reinforced by glass fibers.

5. Inner tube element according to claim 1, characterized in that it is made of epoxy resin reinforced by glass fiber webs.

6. Inner tube element according to claim 1, characterized in that it comprises several glass fiber webs crossing each other at an angle between 40° and 60°.

* * * * *

UNITED STATES PATENT AND TRADEMARK OFFICE
CERTIFICATE OF CORRECTION

PATENT NO.  : 4,428,602
DATED       : January 31, 1984
INVENTOR(S) : Honore Joseph LAMBOT et al It is certified that error appears in the above-identified patent and that said Letters Patent is hereby corrected as shown below:

On the title page,
Please correct the assignees' names and addresses as follows:

-- Societe Anonyme Diamant Boart,

Brussels, Belgium and

Wavin B.V.

Zwolle, The Netherlands --

Signed and Sealed this

Twenty-fourth Day of July 1984

[SEAL]

Attest:

GERALD J. MOSSINGHOFF

Attesting Officer

Commissioner of Patents and Trademarks